(12) United States Patent
Hecht et al.

(10) Patent No.: US 8,434,565 B2
(45) Date of Patent: May 7, 2013

(54) HAND-HELD POWER TOOL

(75) Inventors: Joachim Hecht, Magstadt (DE); Gerd Schlesak, Tamm (DE); Juergen Lennartz, Ostfildern (DE); Stefan Holst, Ulm (DE); Klaus Kuespert, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 136 days.

(21) Appl. No.: 12/921,858

(22) PCT Filed: Nov. 18, 2008

(86) PCT No.: PCT/EP2008/065705
§ 371 (c)(1),
(2), (4) Date: Sep. 10, 2010

(87) PCT Pub. No.: WO2009/112098
PCT Pub. Date: Sep. 17, 2009

(65) Prior Publication Data
US 2011/0024149 A1  Feb. 3, 2011

(30) Foreign Application Priority Data
Mar. 12, 2008  (DE) ............... 10 2008 000 625

(51) Int. Cl.
*B25D 17/24* (2006.01)
(52) U.S. Cl.
USPC ............... 173/162.1; 173/162.2; 173/170; 173/211
(58) Field of Classification Search .......... 173/210, 173/211, 162.1, 162.2, 170, 109, 201
See application file for complete search history.

(56) References Cited

U.S. PATENT DOCUMENTS

| | | | |
|---|---|---|---|
| 3,028,841 A | | 4/1962 | Leavell |
| 3,788,404 A | * | 1/1974 | Koudelka et al. ............. 173/211 |
| 4,014,392 A | * | 3/1977 | Ross .............................. 173/118 |
| 4,282,938 A | * | 8/1981 | Minamidate ................ 173/162.2 |
| 6,421,880 B1 | * | 7/2002 | Prajapati et al. ................ 16/431 |
| 7,322,428 B2 | * | 1/2008 | Bacila ......................... 173/162.2 |
| 7,383,895 B2 | * | 6/2008 | Aoki ............................. 173/201 |
| 7,451,833 B2 | * | 11/2008 | Hahn ............................. 173/104 |
| 7,588,097 B2 | * | 9/2009 | Kamegai et al. ........... 173/162.1 |
| 7,604,071 B2 | * | 10/2009 | Ikuta ........................... 173/162.1 |
| 7,766,096 B2 | * | 8/2010 | Satou et al. ................ 173/162.2 |
| 7,806,201 B2 | * | 10/2010 | Aoki ............................. 173/210 |

FOREIGN PATENT DOCUMENTS

| | | |
|---|---|---|
| DE | 815179 C | 10/1951 |
| JP | 52109673 A | 9/1977 |
| SU | 1377482 | 2/1988 |
| WO | 2007102449 A1 | 9/2007 |

OTHER PUBLICATIONS

Database WPI Week 198838, Thomson Scientific, London, Great Britain, AN 1988-269098, XP-002514129.

* cited by examiner

*Primary Examiner* — Scott A. Smith
(74) *Attorney, Agent, or Firm* — Maginot, Moore & Beck

(57) ABSTRACT

The invention relates to a hand-held power tool, especially a rotary hammer and/or chisel hammer. The hand-held power tool is provided with a vibration dampening unit having a first absorber mass unit with a first vibration dampening direction and at least one second absorber mass unit with a second vibration dampening direction. The hand-held power tool in particular has the first vibration dampening direction of the first absorber mass unit disposed as substantially parallel to the second vibration dampening direction of the second absorber mass unit.

16 Claims, 3 Drawing Sheets

HAND-HELD POWER TOOL

CROSS-REFERENCE TO RELATED APPLICATION

This application is a 35 USC 371 application of PCT/EP2008/065705 filed on Nov. 18, 2008.

BACKGROUND OF THE INVENTION

1. Field of the Invention

The invention is based on a hand-held power tool.

2. Description of the Prior Art

A hand-held power tool with an oscillation damping unit is already known. The oscillation damping unit has a first damper mass unit with a first oscillation damping direction and a second damper mass unit with a second oscillation damping direction.

ADVANTAGES AND SUMMARY OF THE INVENTION

The invention is based on a hand-held power tool, in particular a rotary hammer and/or a chisel hammer, equipped with an oscillation damping unit that has a first damper mass unit with a first oscillation damping direction and has at least one second damper mass unit with a second oscillation damping direction.

According to one proposal, the first oscillation damping direction of the first damper mass unit is oriented essentially parallel to the second oscillation damping direction of the second damper mass unit. In this context, a "damper mass unit" should in particular be understood to mean a unit comprising at least one damper mass element and one elastic element; the damper mass element is excited to execute a counter-oscillation, at least within a provided frequency range of an initial oscillation and/or excitation oscillation of an oscillation system, in particular of the hand-held power tool, which oscillation acts on the damper mass element from outside the damper mass unit; the counter-oscillation preferably extracts oscillation energy from the initial oscillation and/or excitation oscillation of the oscillation system and consequently contributes to a reduction in the oscillations of the oscillation system. The elastic element in this case can be composed of an elastomer element, an elastic spring, in particular a leaf spring, a spiral spring and/or a helical spring, a gas spring, etc. In addition, an "oscillation damping direction" should in particular be understood to be a direction along which the damper mass unit is provided to achieve an oscillation damping and/or that is comprised of a preferred direction of an oscillation damping of the damper mass unit. In addition, "oriented essentially parallel to" should in particular be understood to mean that the first oscillation damping direction of the first damper mass unit encloses a maximum angle of ±12°, particularly advantageously, a maximum angle of ±8°, and particularly preferably, a maximum angle of ±3°, in relation to the second oscillation damping direction of the second damper mass unit. By means of the embodiment according to the invention, it is advantageously possible to achieve an oscillation reduction during operation of the hand-held power tool over a broad frequency range of oscillation and thus a high degree of ease of use for an operator of the hand-held power tool.

According to another proposal, an oscillation natural frequency of the first damper mass unit is embodied to differ from an oscillation natural frequency of the second damper mass unit. In this context, an "oscillation natural frequency" should in particular be understood to be a frequency of one of the damper mass units with which the damper mass unit or a damper mass of the damper mass unit can oscillate after a preferably single excitation of the damper mass unit. Preferably, a value of the oscillation natural frequency of an oscillation system, in particular of the damper mass unit, depends on a mass, in particular a damper mass, and/or a spring constant of an elastic element. In this case, the oscillation natural frequencies of the damper mass units can be adapted to an oscillation behavior during operation of the hand-held power tool. Preferably, an expected oscillation amplitude of the hand-held tool lies between a minimum and a maximum oscillation natural frequency of the at least two damper mass units. By implementing different oscillation natural frequencies of the two damper mass units, it is advantageously possible to effectively achieve a reduction in oscillations over a wide frequency range.

If the two oscillation natural frequencies in this case have a difference of at most 15%, then this achieves an effective, easy-to-manufacture embodiment of the two damper mass units. A particularly effective and yet even less expensive-to-manufacture oscillation reduction is achieved if a difference between the two oscillation natural frequencies is kept to a maximum of 10%. If a difference between the two oscillation natural frequencies lies between 5% and a maximum of 10%, then this achieves the most effective embodiment of an oscillation damping.

If the at least two damper mass units are arranged so that they are decoupled from each other, then each of the damper mass units can advantageously contribute to a reduction in oscillations or to an oscillation damping within the range of the oscillation natural frequency during operation of the hand-held power tool and it is thus possible to maintain a broad oscillation damping spectrum. In addition, it is possible to effectively prevent undesirable influences or repercussions between the individual damper mass units. In this context, "decoupled" should in particular be understood to mean that the at least two damper mass units are situated separately from each other with regard to a transmission and/or exchange of a force and/or an energy.

In another proposed embodiment of the invention, the at least two damper mass units are situated one after the other along an oscillation damping direction or the at least two damper mass units are situated one after another along a direction that extends essentially perpendicular to the oscillation damping direction. By means of this, a particularly space-saving, compact arrangement of the at least two damper mass units can be achieved in that a structural arrangement of the oscillation damping unit can be advantageously adapted to a structure, in particular a shape, of the hand-held power tool.

According to another proposal, the oscillation damping direction of at least one damper mass unit is oriented essentially parallel to a working direction, which advantageously makes it possible to preferably damp oscillation pulses that are produced during an operation of the hand-held power tool. It is also fundamentally possible for the oscillation damping direction to be oriented in a direction that differs from the working direction. The working direction is preferably constituted by a direction along which a force can be transmitted, in particular to a tool, for example an impact direction of an impact mechanism.

According to another proposal, at least one of the damper mass units has at least one damper mass element and two elastic elements and the damper mass element is situated along the oscillation damping direction, at least partially between the two elastic elements, which advantageously makes it possible to achieve an oscillating support of the damper mass element in a structurally simple fashion. Preferably, the damper mass element is composed of a metal. Particularly preferably, at least one elastic element is composed of a spring element, in particular a helical spring.

According to another proposal, at least one of the at least two damper mass units has at least one guide element for guiding a damper mass element along an oscillation damping direction, making it possible to achieve a particularly low-wear oscillation damping. In addition, in the case of an oscillation excitation from an external source, the guide element can guide an oscillating motion along a preferred direction, in particular along the oscillation damping direction.

Other advantages ensue from the following description of the drawings. The drawings show exemplary embodiments of the invention. The drawings, the description, and the claims contain numerous features in combination. Those skilled in the art will also suitably consider the features individually and unite them to form other meaningful combinations.

BRIEF DESCRIPTION OF THE DRAWINGS

Exemplary embodiments of the invention will be explained in greater detail in the following description in conjunction with the drawings, in which:

FIG. 1 shows a hand-held power tool 10a according to the invention, embodied in the form of a rotary hammer. The hand-held power tool 10a has a housing 52a and in a front region 54a, has a tool holder 56a for accommodating a tool, not shown in detail. At an end 58a oriented away from the front region 54a, the hand-held power tool 10a has a main handle 60a for operating the hand-held power tool 10a and for transmitting force from the operator to the hand-held power tool 10a. To produce a torque, the hand-held power tool 10a has a electric drive unit 62a, shown schematically, constituted by an electric motor. The torque of the drive unit 62a, constituted by a driving moment, is transmitted via a transmission unit 64a, shown schematically, of the hand-held power tool 10a to a pneumatic impact unit 66a, shown schematically, and/or to a rotating output mechanism constituted by a hammer tube. In an impact mode of the hand-held power tool 10a, a hammering impetus is generated by the impact unit 66a and transmitted to the tool.

Figure 1:
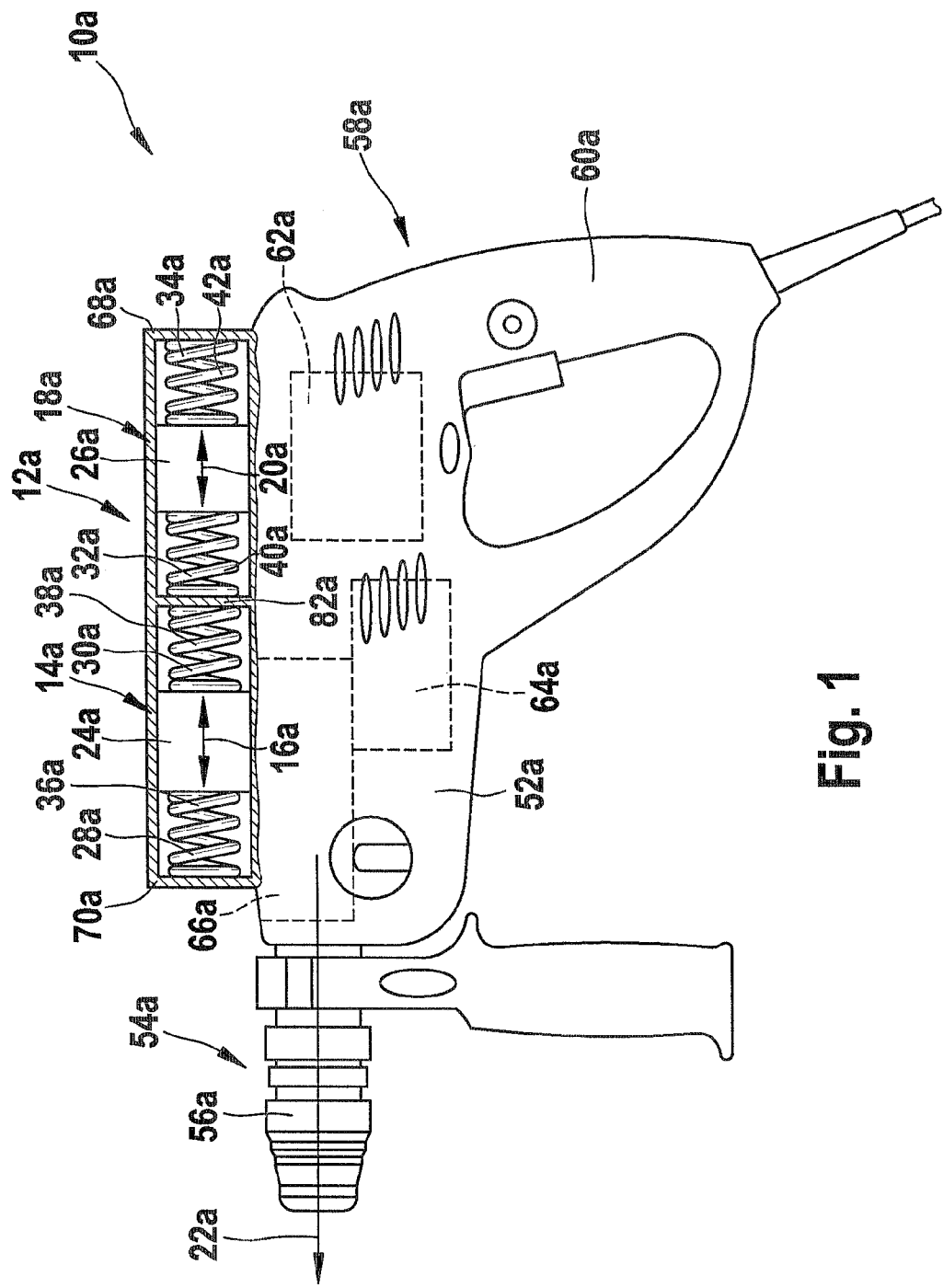
FIG. 1 is a schematic depiction of a hand-held power tool according to the invention, embodied in the form of a rotary hammer, equipped with an oscillation damping unit.

In addition, the hand-held power tool 10a has an oscillation damping unit 12a that is provided for damping oscillations that can be transmitted from the impact unit 66a to the housing 52a and/or to other components of the hand-held power tool 10a during operation of the hand-held power tool 10a. The oscillation damping unit 12a is encompassed by the housing 52a of the hand-held power tool 10a and has a first damper mass unit 14a with a first oscillation damping direction 16a and a second damper mass unit 18a with a second oscillation damping direction 20a. The first damper mass unit 14a is provided for an oscillation damping along the first oscillation damping direction 16a and the second damper mass unit 18a is provided for an oscillation damping along the second oscillation damping direction 20a. The first oscillation damping direction 16a of the first damper mass unit 14a here is essentially parallel to the second oscillation damping direction 20a of the second damper mass unit 18a. The two damper mass units 14a, 18a are arranged one after the other along the oscillation damping directions 16a, 20a. In a different embodiment of the invention, the damper mass units 14a, 18a can basically also be arranged one after the other along a direction extending perpendicular to the oscillation damping directions 16a, 20a, with oscillation damping directions 16a, 20a oriented essentially parallel to each other.

The two damper mass units 14a, 18a and the two oscillation damping directions 16a, 20a are also oriented essentially parallel to a working direction 22a of the hand-held power tool 10a. In this case, the working direction 22a is constituted by an impact direction of the impact unit 66a so that the oscillation damping unit 12a and/or the two damper mass units 14a, 18a contribute(s) to a reduction in an oscillating motion along a preferred direction of an oscillation propagation constituted by an impact direction during operation of the hand-held power tool 10a.

Figure 2:
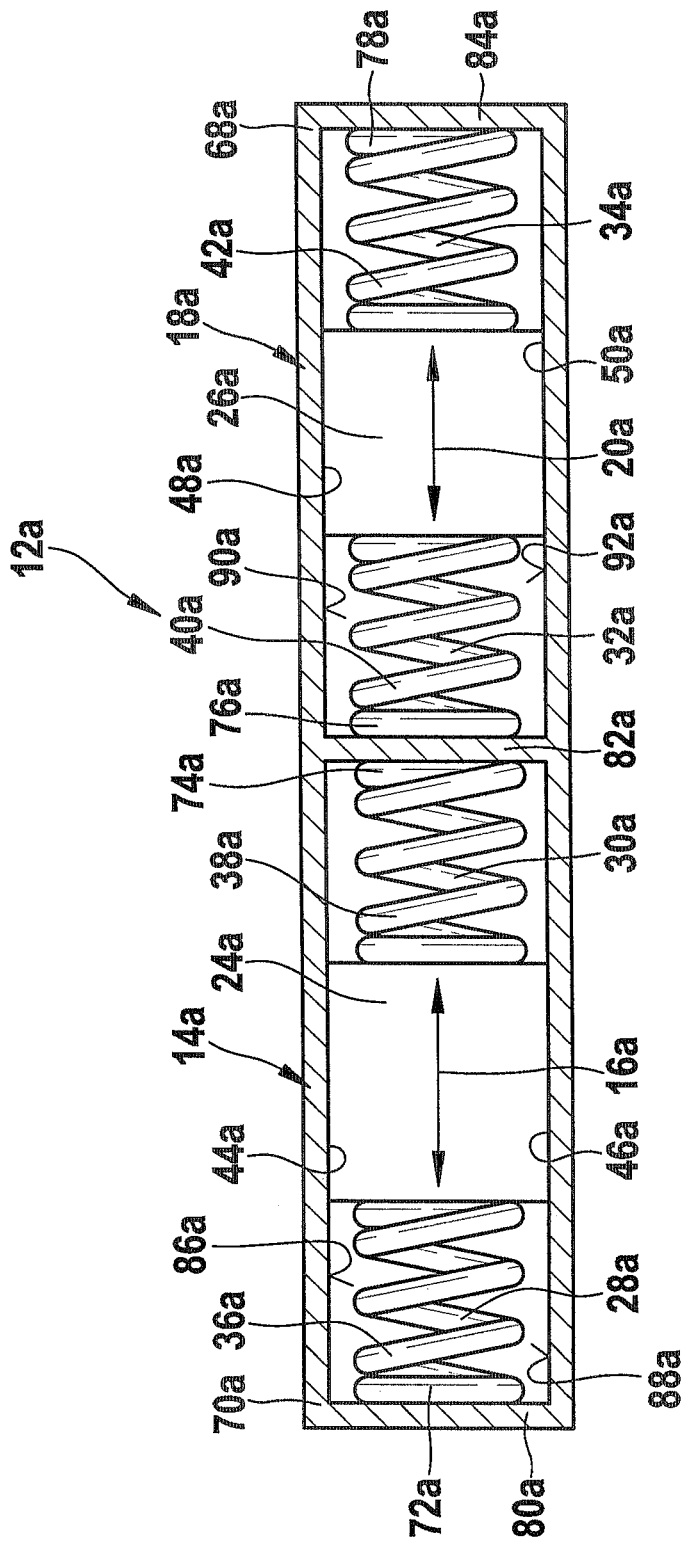
FIG. 2 is a schematic depiction of the oscillation damping unit equipped with two damper mass units.

In addition, the two damper mass units 14a, 18a are situated so that they are decoupled from each other. Each of the two damper mass units 14a, 18a has its own damper mass housing 68a, 70a. In addition, the two damper mass units 14a, 18a each have a respective damper mass element 24a, 26a composed of a metal and two respective elastic elements 28a, 30a, 32a, 34a that are each composed of a respective spring element 36a, 38a, 40a, 42a (FIGS. 1 and 2). The damper mass elements 24a, 26a are each situated between the two respective spring elements 36a, 38a, 40a, 42a along the oscillation damping directions 16a, 20a; a respective end 72a, 74a, 76a, 78a of each of the spring elements 36a, 38a, 40a, 42a oriented away from the respective damper mass element 24a, 26a in the oscillation damping directions 16a, 20a is situated or supported against the damper mass housing 68a, 70a or against a fixed wall 80a, 82a, 84a of the damper mass housing 68a, 70a (see FIG. 2).

The two damper mass units 14a, 18a each have a respective oscillation natural frequency that depends on the respective properties of the damper mass elements 24a, 26a and the properties of the spring elements 36a, 38a, 40a, 42a. The oscillation natural frequency of the first damper mass unit 14a is embodied to produce a broad frequency spectrum embodied in the form of a damping spectrum, which is different from the oscillation natural frequency of the second damper mass unit 18a. The two oscillation natural frequencies here differ from each other by an amount of between 5% and at most 10%; the oscillation natural frequencies of the first and second damper mass unit 14a, 18a are adapted to an oscillation behavior of the hand-held power tool 10a and/or to the impact unit 66a of the hand-held power tool 10a. In this case, an operating point of the hand-held power tool 10a advantageously lies between a maximum value of one of the two oscillation natural frequencies and a minimum value of one of the two oscillation natural frequencies.

The damper mass units 14a, 18a also each have two respective guide elements 44a, 46a, 48a, 50a to guide the respective damper mass element 24a, 26a. The guide elements 44a, 46a, 48a, 50a are situated on an inward-facing surface 86a, 88a, 90a, 92a of the damper mass housing 68a, 70a. The guide elements 44a, 46a, 48a, 50a here are oriented along the oscillation damping direction 16a, 20a on the inward-facing surface 86a, 88a, 90a, 92a. In addition, the two guide elements 44a, 46a, 48a, 50a of one of the damper mass units 14a, 18a are embodied of one piece with the damper mass housing 68a, 70a or with the inward-facing surface 86a, 88a, 90a, 92a. The guide elements 44a, 46a, 48a, 50a here can be embodied in the form of guide rails and/or other guide elements 44a, 46a, 48a, 50a deemed suitable by the person skilled in the art.

Figure 3:
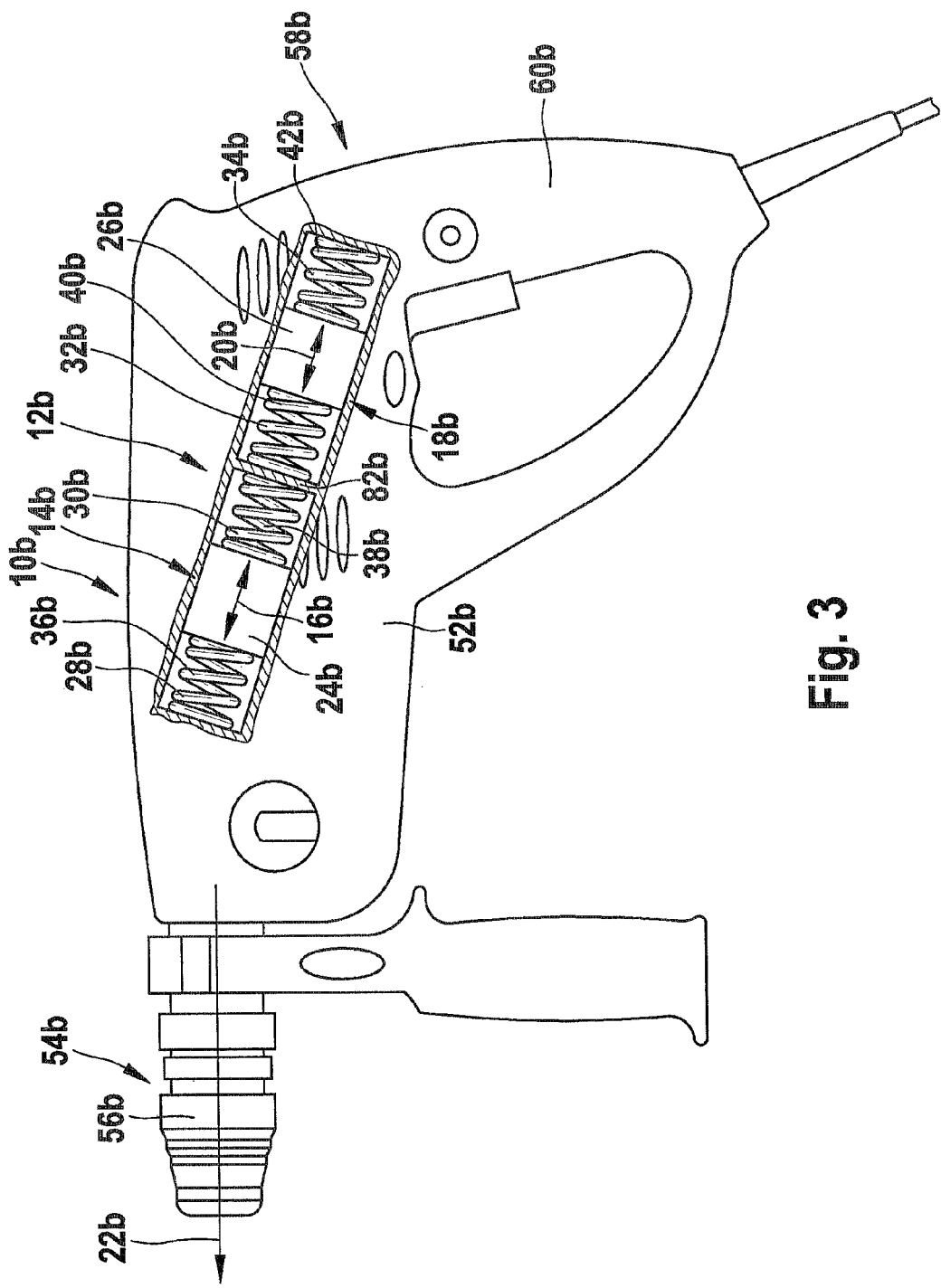
FIG. 3 is a schematic depiction of the hand-held power tool, with an arrangement of the oscillation damping unit alternative to the one shown in FIG. 1.

FIG. 3 shows an alternative exemplary embodiment. Components, features, and functions that remain the same have basically been labeled with the same reference numerals. To differentiate between the exemplary embodiments, however, the letters a and b have been added to the reference numerals of the different exemplary embodiments. The description below is essentially limited to the differences from the exemplary embodiment shown in FIGS. 1 and 2; for components, features, and functions that remain the same, please refer to the description of the exemplary embodiment shown in FIGS. 1 and 2.

A hand-held power tool 10b constituted by a rotary hammer has an oscillation damping unit 12b equipped with a first damper mass unit 14b and a second damper mass unit 18b. The two damper mass units 14b, 18b each have a respective oscillation damping direction 16b, 20b; a first oscillation damping direction 16b of the first damper mass unit 14b is oriented essentially parallel to a second oscillation damping direction 20b of the second damper mass unit 18b. The two damper mass units 14b, 18b are decoupled from each other and situated one after the other along the oscillation damping directions 16b, 20b. In addition, the damper mass elements 24a, 26a are oriented at an angle relative to a working direction 22b, constituted by an impact direction, of the hand-held power tool 10b so that both oscillation damping directions 16b, 20b enclose an angle not equal to zero with the working direction 22b.

The foregoing relates to the preferred exemplary embodiments of the invention, it being understood that other variants and embodiments thereof are possible within the spirit and scope of the invention, the latter being defined by the appended claims.

The invention claimed is:

1. A hand-held power tool comprising an oscillation damping unit having a first damper mass unit with a first oscillation damping direction and at least one second damper mass unit with a second oscillation damping direction,
   wherein the first oscillation damping direction of the first damper mass unit is oriented essentially parallel to the second oscillation damping direction of the at least one second damper mass unit,
   wherein the first damper mass unit has a first oscillation natural frequency and the at least one second damper mass unit has a second oscillation natural frequency,
   wherein the first oscillation natural frequency is different from the second oscillation natural frequency,
   wherein the first damper mass unit and the at least one second damper mass unit are situated one after another along a common longitudinal axis extending in the first oscillation damping direction,
   wherein the first damper mass unit includes: (i) a first coil spring, (ii) a second coil spring, and (iii) a first damper mass element movably interposed between the first coil spring and the second coil spring, and
   wherein the at least one second damper mass unit includes: (i) a third coil spring, (ii) a fourth coil spring, and (iii) a second damper mass element movably interposed between the third coil spring and the fourth coil spring.

2. The hand-held power tool as recited in claim 1, wherein a difference between the first oscillation natural frequency and the second oscillation natural frequency is at most 15%.

3. The hand-held power tool as recited in claim 2, wherein the first damper mass unit and the at least one second damper mass unit are arranged so that they are decoupled from each other.

4. The hand-held power tool as recited in claim 2, wherein the first oscillation damping direction of at least one damper mass unit is oriented essentially parallel to a working direction of the power tool.

5. The hand-held power tool as recited in claim 1, wherein a difference between the first oscillation natural frequency and the second oscillation natural frequency is at most 10%.

6. The hand-held power tool as recited in claim 5, wherein the first damper mass unit and the at least one second damper mass unit are arranged so that they are decoupled from each other.

7. The hand-held power tool as recited in claim 5, wherein the first oscillation damping direction of at least one damper mass unit is oriented essentially parallel to a working direction of the power tool.

8. The hand-held power tool as recited in claim 1, wherein a difference between the first oscillation natural frequency and the second oscillation natural frequency is at most 5%.

9. The hand-held power tool as recited in claim 8, wherein the first damper mass unit and the at least one second damper mass unit are arranged so that they are decoupled from each other.

10. The hand-held power tool as recited in claim 8, wherein the first oscillation damping direction of at least one damper mass unit is oriented essentially parallel to a working direction of the power tool.

11. The hand-held power tool as recited in claim 1, wherein at least one of the first damper mass unit and the at least one second damper mass unit has at least one guide element for guiding the damper mass element along an oscillation damping direction.

12. The hand-held power tool as recited in claim 1, wherein the first and second oscillation damping directions are oriented essentially parallel to a working direction of the power tool.

13. The hand-held power tool as recited in claim 1, wherein the first and second coil springs are substantially equal in size.

14. The hand-held power tool as recited in claim 1, wherein the third and fourth coil springs are substantially equal in size.

15. The hand-held power tool as recited in claim 1, wherein the first, second, third, and fourth coil springs are substantially equal in size.

16. The hand-help power tool as recited in claim 1, wherein the first damper mass unit and the second damper mass unit are mounted to an exterior surface of the hand-held power tool.

* * * * *